United States Patent
Rowe et al.

(10) Patent No.: US 10,392,962 B2
(45) Date of Patent: Aug. 27, 2019

(54) ROTOR BLADE DAMAGE

(71) Applicant: ROLLS-ROYCE plc, London (GB)

(72) Inventors: Arthur L Rowe, Derby (GB); Mark N Binnington, Bristol (GB); Colin J Woodward, Derby (GB); Paul R Thornton, Derby (GB)

(73) Assignee: ROLLS-ROYCE plc, London (GB)

( * ) Notice: Subject to any disclaimer, the term of this patent is extended or adjusted under 35 U.S.C. 154(b) by 201 days.

(21) Appl. No.: 15/620,163

(22) Filed: Jun. 12, 2017

(65) Prior Publication Data

US 2018/0003073 A1    Jan. 4, 2018

(30) Foreign Application Priority Data

Jul. 1, 2016 (GB) .................................. 1611524.8

(51) Int. Cl.
*F01D 21/00* (2006.01)
*F02C 9/00* (2006.01)
(Continued)

(52) U.S. Cl.
CPC .............. *F01D 21/003* (2013.01); *F02C 9/00* (2013.01); *F04D 27/001* (2013.01); *G01H 1/006* (2013.01); *G01P 3/46* (2013.01); *F01D 21/04* (2013.01); *F05D 2220/32* (2013.01); *F05D 2240/20* (2013.01); *F05D 2260/83* (2013.01); *F05D 2270/304* (2013.01)

(58) Field of Classification Search
None
See application file for complete search history.

(56) References Cited

U.S. PATENT DOCUMENTS

| 4,833,405 A | * | 5/1989 | Richards | ................. G01B 7/02 |
| | | | | 324/207.16 |
| 6,999,884 B2 | | 2/2006 | Astley et al. | |
| | | | (Continued) | |

FOREIGN PATENT DOCUMENTS

EP    1 382 805 A2    1/2004
EP    1936335 A2 *   6/2008   .......... F01D 21/003
(Continued)

OTHER PUBLICATIONS

Nov. 14, 2017 Search Report issued in European Patent Application No. 17 17 5498.
(Continued)

*Primary Examiner* — Jonathan M Dager
*Assistant Examiner* — Garrett F Evans
(74) *Attorney, Agent, or Firm* — Oliff PLC (57) ABSTRACT

A rotor assembly (30) comprising a rotor (32) having an annular array of rotor blades (34), the rotor mounted to a shaft (38). A phonic wheel (40) coupled to the shaft. A speed sensor (44) axially aligned with the phonic wheel and configured to measure voltage (V), amplitude of the voltage being proportional to clearance (46) between the sensor and phonic wheel. A processor (48) configured to: receive the voltage measurement; derive shaft speed (ω) from the voltage measurement; identify modulation of the voltage amplitude at a frequency which is an integer multiple of the shaft speed; compare voltage amplitude to a threshold; and output a rotor damage signal based on the comparison.

18 Claims, 4 Drawing Sheets

(51) Int. Cl.
    *F04D 27/00*     (2006.01)
    *G01P 3/46*     (2006.01)
    *G01H 1/00*     (2006.01)
    *F01D 21/04*     (2006.01)

(56) References Cited

U.S. PATENT DOCUMENTS

| | | |
|---|---|---|
| 8,560,272 B2 | 10/2013 | Gerez et al. |
| 8,650,966 B2 | 2/2014 | McMillan |
| 2012/0107094 A1* | 5/2012 | Lillis ................ F01D 17/06 415/118 |
| 2015/0130450 A1* | 5/2015 | Gehringer ............ G01D 5/145 324/207.25 |
| 2015/0308859 A1 | 10/2015 | Lerchenmueller |

FOREIGN PATENT DOCUMENTS

| | | |
|---|---|---|
| EP | 1936335 A2 | 6/2008 |
| EP | 2594946 A1 | 5/2013 |

OTHER PUBLICATIONS

Jan. 16, 2017 Search Report issued in British Patent Application No. 1611524.8.

* cited by examiner

ROTOR BLADE DAMAGE

The present disclosure concerns a rotor assembly and a method to detect rotor blade damage. In particular, but not exclusively, it concerns a rotor assembly in a gas turbine engine.

A turbofan gas turbine engine has a fan assembly housed within the nacelle which rotates on a shaft. In rare circumstances one or more of the fan blades may be damaged, for example by a bird or other foreign object striking the blades. Such damage may cause part or all of a fan blade to become detached from the rotor hub. It is important to detect such damage and to accommodate its effects.

One effect of damage to the fan blades, and particularly the partial or total loss of one or more of the fan blades, is that the centre of balance of the fan assembly is no longer coaxial with the fan shaft and the fan is said to be "out of balance". Thus the fan rotor orbits asymmetrically. This can cause strain on the shaft and bearings. It can also cause destruction of nearby components, including the bearing supports.

EP 1 382 805 describes a method to overcome the effects of out of balance forces. A frangible coupling is provided that preferentially fails in response to the out of balance forces thereby enabling the fan to rotate about its new centre of balance unconstrained by its connection to the shaft. The frangible coupling includes an annular array of fuse ligaments that include stress-raising features, such as a portion of thinner material or a snub, to more tightly control the force at which they fail.

One problem with mechanical solutions to out of balance forces caused by fan blade damage is that the frangible couplings must be designed to fail when required but not to fail when abnormal oscillatory motion of the rotor blades around the shaft are caused by something other than fan blade damage. Another problem with mechanical solutions is that where a relatively small part of a fan blade is broken off the out of balance forces may not be sufficient to sever or shear the frangible couplings but will be sufficient to apply excessive forces on other components. In extremis this may cause rubbing or severing of the fan rotor and/or fan case, and may cause the turbine which drives the fan to over-heat or over-speed.

According to a first aspect there is provided a rotor assembly in a gas turbine engine, the rotor assembly comprising:
- a rotor having an annular array of rotor blades, the rotor mounted to a shaft;
- a phonic wheel coupled to the shaft;
- a speed sensor axially aligned with the phonic wheel and configured to measure voltage, amplitude of the voltage being proportional to clearance between the sensor and phonic wheel; and
- a processor configured to:
  i) receive the voltage measurement;
  ii) derive shaft speed from the voltage measurement;
  iii) identify modulation of the voltage amplitude at a frequency which is an integer multiple of the shaft speed;
  iv) compare voltage amplitude to a threshold; and
  v) output a rotor damage signal based on the comparison.

Advantageously the rotor assembly provides a robust way in which rotor damage can be identified before the damage propagates to other components. For example, rotor blade damage can be identified before the whole rotor assembly breaks up or damages the rotor casing or other adjacent components. The integer multiplier of the frequency of modulation may be one. Alternatively it may be more than one.

Advantageously the processor is configured to process measurements from existing components of the rotor assembly so no additional hardware is required. Advantageously there is no weight penalty to implementing the invention. Advantageously the invention may be retrofitted to existing rotor assemblies which have a phonic wheel and speed sensor associated with the shaft.

The threshold may comprise a ratio of maximum to average voltage amplitude. Alternatively the threshold may comprise a predetermined proportion of maximum voltage amplitude. The predetermined proportion may be 80%. Step v) may comprise outputting the rotor damage signal if the voltage amplitude exceeds the threshold. Alternatively step v) may comprise outputting the rotor damage signal if the voltage amplitude is lower than the threshold.

The rotor may be a fan. The rotor blades are therefore fan blades. Alternatively the rotor may be a compressor, a stage of a compressor, a turbine or a stage of a turbine.

The rotor assembly may further comprise a second phonic wheel and a second speed sensor which is axially aligned with the second phonic wheel and configured to measure voltage. Advantageously the processor can be configured to receive voltage measurements from each of the phonic wheels. The processor may be configured to output the rotor damage signal based on the comparison of the voltage amplitude from each speed sensor with the threshold. Advantageously the second voltage measurement may be used to confirm the voltage measurement taken by the phonic wheel.

The processor may be further configured to increment a counter value if the voltage amplitude is greater than the threshold. The counter value may be one. Advantageously there is no delay in outputting the rotor damage signal. Alternatively the counter value may be three. Alternatively the counter value may be a different number which is greater than one. Advantageously isolated exceedances of the voltage amplitude do not cause the processor to output the rotor damage signal.

Where the counter value is set to a number greater than one, the processor may be configured to decrease the counter value if a predetermined length of time has elapsed since the previous increment. Where the counter value is set to a number greater than one, the processor may be configured to reset the counter value to zero if a predetermined length of time has elapsed since the previous increment. Advantageously temporally disparate isolated exceedances cannot cause the process to output the rotor damage signal.

A gas turbine engine comprising the rotor assembly as described. The gas turbine engine may comprise an engine controller, the engine controller configured to i) receive the rotor damage signal; and ii) generate an engine control signal. The engine control signal may comprise: a command to decelerate the gas turbine engine to idle; or a command to shut down the engine. Advantageously the gas turbine engine can be safely slowed to idle or shut down before damage is spread beyond the rotor assembly.

The present invention also provides a method to detect rotor damage in a gas turbine engine, the method comprising steps to:
- monitor speed of a rotor shaft using a phonic wheel and speed sensor;
- monitor voltage amplitude from the speed sensor;
- identify modulation of the voltage amplitude at a frequency that is an integer multiple of the shaft speed;

compare the voltage amplitude to a threshold; and
declare rotor damage based on the comparison.

Advantageously the method identifies the effects of out of balance oscillation of the rotor caused by rotor damage more quickly than known methods. Advantageously mitigation action can be instigated to prevent or reduce the consequential effects of the rotor damage on other components of the gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
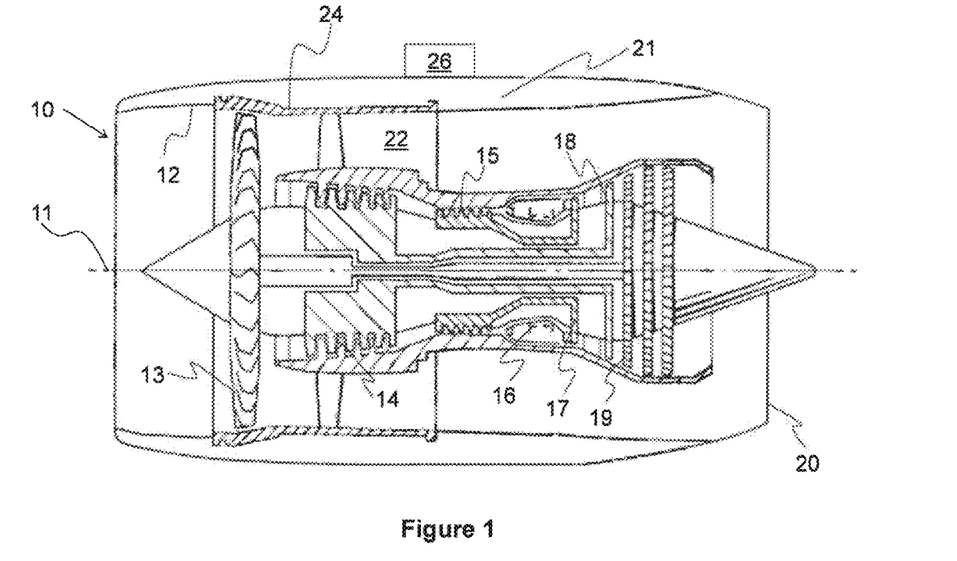
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
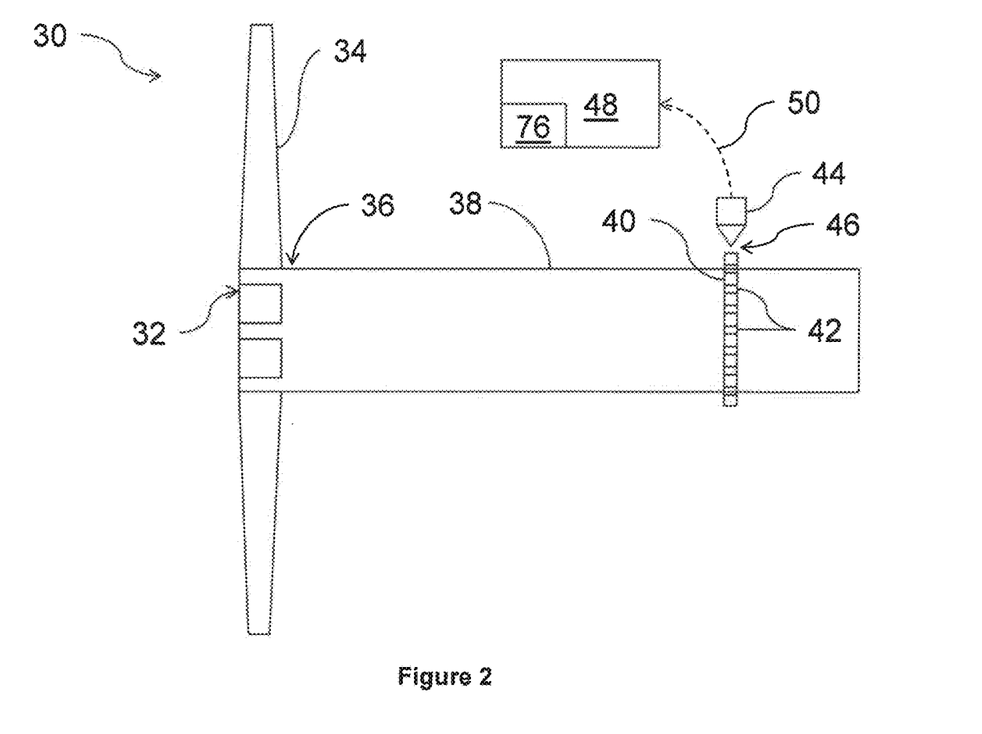
FIG. 2 is a schematic side view of a rotor assembly.

FIG. 2 shows a rotor assembly 30 which is in the gas turbine engine 10. The rotor assembly 30 includes a rotor 32 which comprises an annular array of rotor blades 34 mounted around and radiating from a rotor hub 36. The rotor 32 is mounted to a shaft 38. The hub 36 may be integrally formed with the shaft 38 or mounted to it. The rotor 32 thus rotates concentrically with the shaft 38 about an axis, for example the engine rotational axis 11.

At another axial location on the shaft 38 a phonic wheel 40 is coupled to the shaft 38. The phonic wheel 40 includes an annular array of teeth 42 which are equi-angularly spaced around the periphery of the shaft 38. In axial alignment with the phonic wheel 40 a speed sensor 44 is provided. The speed sensor 44 is mounted to static structure (not shown) which is adjacent to the shaft 38. A working clearance 46, a radial gap, is maintained between the sensing tip of the speed sensor 44 and the radially outer surfaces of the teeth 42.

Figure 3:
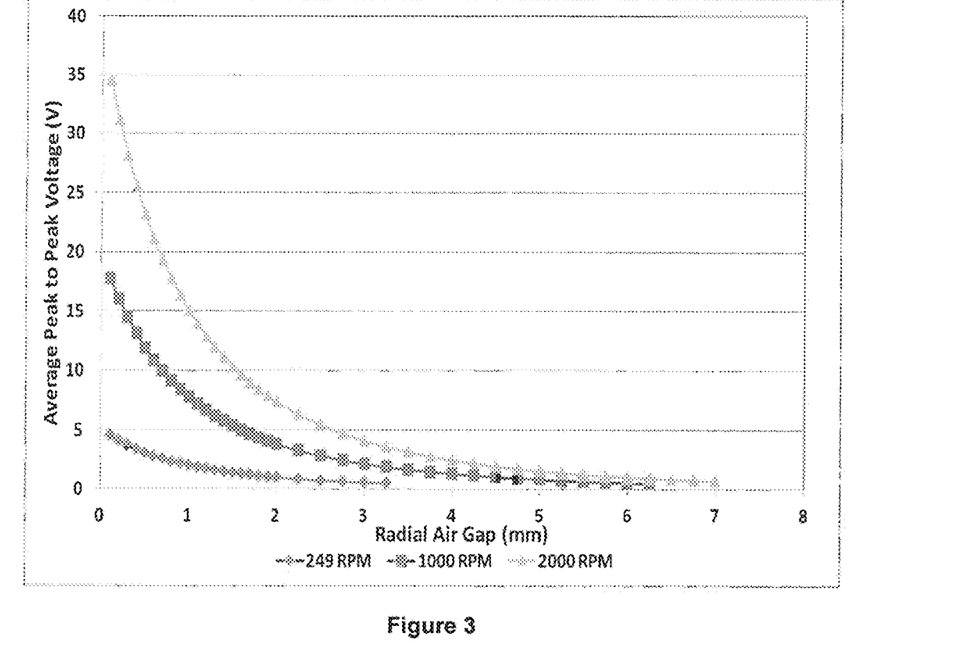
FIG. 3 is a graph showing the relationship between voltage amplitude and radial gap.

The speed sensor 44 is arranged to measure voltage V. The amplitude of the voltage V is dependent on the clearance 46. As can be seen in FIG. 3 the average peak to peak voltage V is inversely proportional to the size of the radial air gap, clearance 46 because the speed sensor 44 is an induction sensor. Thus the greater the clearance 46 the smaller the voltage V and the smaller the clearance 46 the larger the voltage V. In normal operation the clearance 46, radial air gap, and therefore the induced voltage V has two approximate levels; a first high voltage, low clearance level where the speed sensor 44 is aligned with one of the teeth 42 and a second lower voltage, larger clearance level where the speed sensor 44 is aligned with one of the circumferential spaces between teeth 42. There may be a once per revolution tooth 42 (not shown) on the phonic wheel 40 which protrudes a different radial distance from the shaft 38 compared to the other teeth 42. In this case there is a third approximate level of clearance 46, and thus voltage V, which may be greater or smaller than the first level corresponding to the voltage V induced by the normal teeth 42.

As is shown in FIG. 3 the magnitude of the average peak to peak voltage V is also related to shaft speed w, illustrated by the three exemplary lines plotted. For any given clearance 46, radial air gap, the average peak to peak voltage V is larger for faster shaft speeds w.

The voltage V measurements taken by the speed sensor 44 are transmitted to a processor 48 as shown by arrow 50 in FIG. 2. The processor 48 is configured to receive the voltage V measurements. It is also configured to derive the shaft speed ω from the voltage V measurements, for example from the tooth-passing frequency. When the rotor assembly 30 is functioning correctly the peak to peak voltage V is fairly constant whilst the shaft speed ω remains constant. This is because the voltage peaks occur when each tooth 42 passes the speed sensor 44 and each of the teeth 42 are at an approximately constant radial distance from the speed sensor 44. There may be a small, insignificant amount of variation in the peak to peak voltages V due to vibration and/or unequal erosion or debris accumulation of the teeth 42.

However, when damage occurs to the rotor blades 34 so that part of one or more of them is broken off the rotor assembly 30 the rotor shaft 38 no longer rotates about its original rotational axis but instead tends to orbit about its new centre of balance. This means that the radially outer surface of some of the teeth 42 will be closer to the speed sensor 44 than the surface of others of the teeth 42. Consequently the voltage V measured by the speed sensor 44 no longer oscillates between two substantially constant levels, corresponding to the teeth and circumferential gaps passing the speed sensor 44. Instead there will be a range of larger voltages V corresponding to tooth passing positions and a range of smaller voltages V corresponding to circumferential gap positions. The larger and smaller voltage ranges may overlap.

Figure 4:
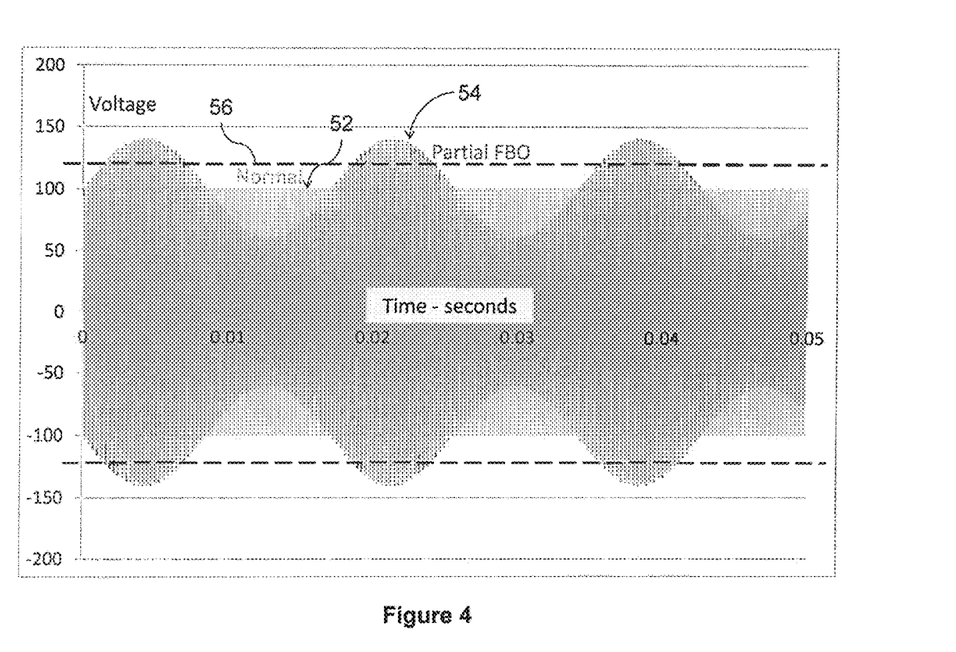
FIG. 4 is a graph showing voltage plotted against time for a normal rotor assembly and a damaged rotor assembly.

Due to the oscillatory nature of the orbit of the rotor assembly 30 when subject to the out of balance forces, the peak to peak voltage V is modulated in a sinusoidal manner. FIG. 4 is a plot of voltage V measured by the speed sensor 44 against time. The normal rotor plot 52 shows that the amplitude of the maximum voltage V remains substantially constant, |100V| as plotted. The damaged rotor plot 54 shows that the amplitude of the maximum voltage V oscillates sinusoidally over time, between approximately |60V| and |135V| as plotted. The amplitude of the voltage V is therefore modulated by the degree of non-concentricity of the orbit of the rotor shaft 38 and phonic wheel 40.

The modulation of the voltage amplitude |V| is related to the first order frequency of the shaft 38. In particular, the modulation frequency is equal to the rotational speed.

A threshold 56 may be set to which the modulation of the voltage V can be compared. If the modulation is greater than the threshold 56, rotor blade damage can be concluded and mitigation action instigated. Such mitigation action may be to decelerate the engine 10, to pull back to idle or to shut down the engine 10. Each of these mitigation actions aims to reduce the energy supplied to the rotor assembly 30 so that the rotor 32 does not work loose and damage surrounding components. By reducing the rotational speed of the rotor assembly 30 the centripetal force is also reduced and the frequency is shifted away from the resonant frequency of the assembly 30. Alternatively mitigation action may include triggering a mechanical fuse to decouple the rotor 32 from the shaft 38 and permit it to rotate about its new centre of balance in a controlled manner.

The gas turbine engine 10 may include an engine controller 26, shown schematically in FIG. 1. The engine controller 26 may be configured to receive the rotor blade damage signal from the processor 48 and to generate an engine control signal. The engine control signal commands the mitigation action, for example to reduce the fuel flow to cause the engine 10 to decelerate or to cut off the fuel flow to shut down the engine 10. The processor 48 may be a function of the engine controller 26 or may be separate thereto.

The threshold 56 may be set to a proportion of the maximum voltage V. For example, the threshold 56 may be set to 80% of the maximum voltage V, with detection occurring if the voltage amplitude V is less than the threshold 56, or the threshold 56 may be set to 120% of the minimum voltage V, with detection occurring if the voltage amplitude V is greater than the threshold 56. For each of these exemplary values the damaged rotor plot 54 will fall in the detection zone for the majority of the cycle, with a small portion of the plot falling on the other side of the threshold 56. The threshold 56 may be set in the range of 10% to 30% of the maximum or minimum voltage V; that is between 70% and 90% where detection is triggered below the threshold 56 or between 110% and 130% where detection is triggered above the threshold 56. An exemplary threshold 56 is illustrated in FIG. 4.

Alternatively the threshold 56 may be set to a ratio of the maximum to the average peak to peak voltage V. For example, the threshold 56 may be set to 20% of the maximum to average voltage V.

Figure 5:
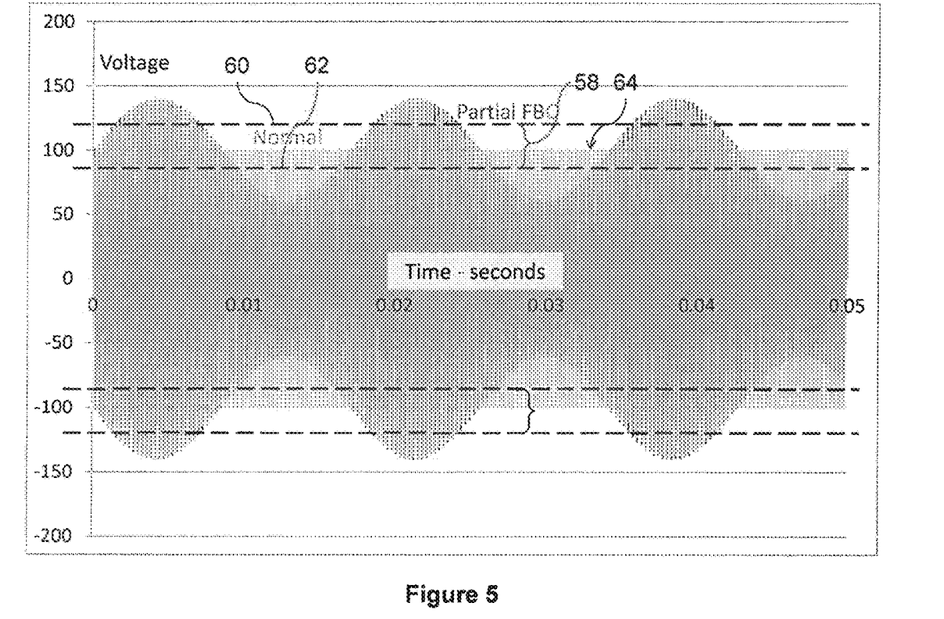
FIG. 5 is another graph showing voltage plotted against time for a normal rotor assembly and a damaged rotor assembly.

The threshold 56 may be configured to detect modulations by forming a threshold band 58 with upper and lower limits 60, 62 around the average peak to peak voltage 64. An exemplary threshold band 58 is shown in FIG. 5. The measured maximum voltages V over time, as shown by normal rotor plot 52 or damaged rotor plot 54, can then be compared to the threshold band 58 to determine if there are periodic excursions outside the band 58, below and above the lower and upper limits 62, 60. For example the threshold band 58 may span 20% of the average peak to peak voltage amplitude 64. The threshold band 58 may be equal around the average voltage 64, so the upper limit 60 is 10% higher and the lower limit 62 is 10% lower for example. Alternatively the threshold band 58 may be unequally positioned around the average voltage 64, so that the upper limit 60 is 15% higher and the lower limit 62 is 5% lower (or vice versa) for example. By providing a threshold band 58 small irregular variations or small modulations of the amplitude of the voltage V measurement do not result in rotor blade damage being declared and thus do not trigger mitigation action.

The sensitivity of the detection system can be improved by applying a learning algorithm or other feedback mechanism. Such algorithm or feedback mechanism can be trained to monitor the level of modulation seen in normal operation and therefore characterise that normal operation. By developing this understanding of the modulation seen in normal operation the threshold band 58 can be set more tightly so that the detection is more sensitive. For example, the threshold band 58 may be set to twice the normal level of modulation. By monitoring the modulation during normal operation it is also possible to monitor the health of the engine components. For example, the modulation may increase as one or more components deteriorate with age, debris accretion or damage.

The rotor 32 may be the fan 13 of the gas turbine engine 10 and the shaft 38 is therefore the low pressure shaft. The phonic wheel 40 may be located axially close to the fan 13. Alternatively it may be further away from it axially, for example close to the combustor 16 or upstream of the low pressure turbine 19.

The detection method is particularly useful where the rotor assembly 30, particularly the rotor blades 34, are partially detached through damage. For example when 20-40% of the rotor blade 34 span is lost. Advantageously the present method is more effective than known methods for detecting this type of damage. For example, known methods rely on the loss of the voltage V measurements from the speed sensor 44 indicating that the rotor blades 34 have destroyed the speed sensor 44 during orbiting. However, although this is the expected result when a complete rotor blade 34 is lost, for a fan assembly 30 this is known as 'fan blade off', when the damage is less severe the radial component of the orbit may not be sufficient for the rotor blade 34 to destroy the speed sensor 44. Advantageously the modulation of the voltage V measurement is rapidly detectable and so mitigation action can be taken more quickly after an event that damages one or more of the rotor blades 34.

Figure 6:
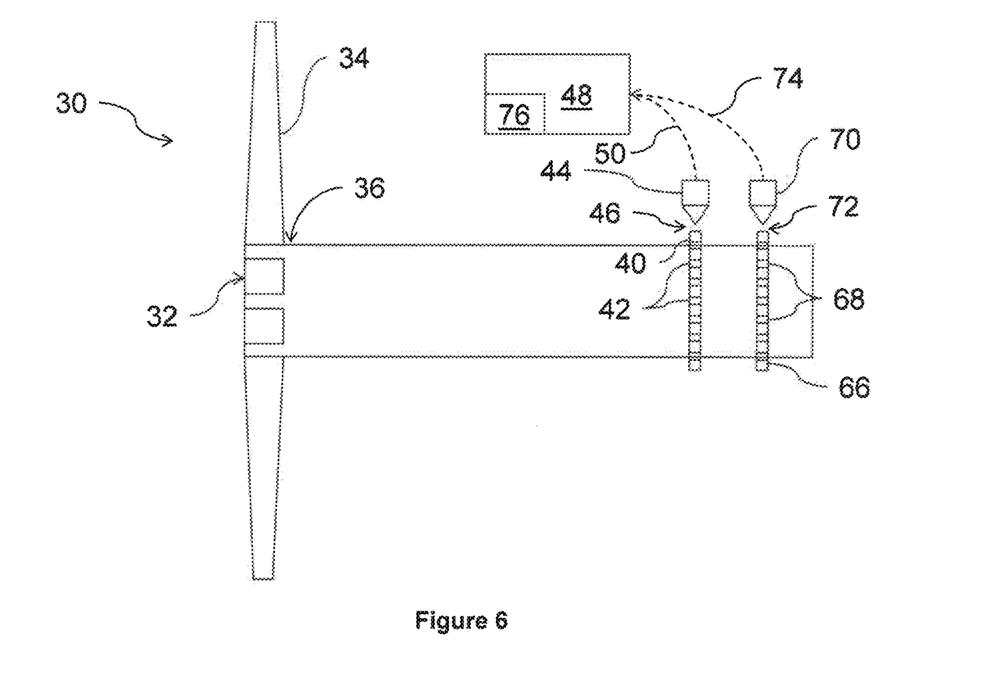
FIG. 6 is another schematic side view of a rotor assembly.

FIG. 6 is similar to FIG. 2. The rotor assembly 30 further comprises a second phonic wheel 66 which has an annular array of teeth 68 protruding radially therefrom. The second phonic wheel 66 is mounted to the shaft 38 at an upstream or downstream axial position relative to the phonic wheel 40, that is closer to or further from the rotor 32. There is also a second speed sensor 70 which is axially aligned with the second phonic wheel 66 and radially spaced from it to give a second clearance 72. The voltage V induced in the second speed sensor 70 by the passing of the teeth 68 of the second phonic wheel 66 is transmitted to the processor 48 as shown by arrow 74. The processor 48 may be configured to output the rotor blade damage signal only if the voltage amplitude measured by each speed sensor 44, 70 is greater than the threshold 56 or is regularly outside the threshold band 58. Advantageously this requirement mitigates against a single spurious measurement being sufficient to trigger significant mitigation action such as pull back to idle or even engine shut down.

Similarly there may be more than one speed sensor 44 arranged in axial alignment with the phonic wheel 40. The speed sensors 44 may form a regular or irregular annular array around the phonic wheel 40. Voltage V is induced in each of the speed sensors 44 with peaks induced by the passing of teeth 42. The voltage measurements are then transmitted to the processor 48. The processor 48 may be configured to output the rotor damage signal only if the voltage amplitudes V from two or more, or all, of the speed sensors 44 exceed the threshold 56 or include regular excursions outside the threshold band 58. By providing more than one speed sensor 44 to measure voltage V induced by the same phonic wheel 40 there is sensor redundancy. Advantageously spurious measurements can be detected and discarded or ignored. However, by setting the modulation frequency equal to the rotational speed there is robust defense against spurious signals.

Similarly there may be more than one second speed sensor 70 arranged in axial alignment with the second phonic wheel 66. The second speed sensors 70 may form a regular or irregular annular array around the second phonic wheel 66. Voltage V is induced in each of the second speed sensors 70 with peaks induced by the passing of teeth 68. The voltage measurements are then transmitted to the processor 48. The processor 48 may be configured to output the rotor damage signal only if the voltage amplitudes V from two or more, or all, of the second speed sensors 70 exceed the threshold 56 or include regular excursions outside the threshold band 58. By providing more than one second speed sensor 70 to measure voltage V induced by the same second phonic wheel 66 there is sensor redundancy. Advantageously spurious measurements can be detected and discarded or ignored.

Where there are two or more speed sensors 44 and two or more second speed sensors 70 the processor 46 may be configured to declare rotor blade damage only if at least two, or only if all, of the voltage V measurements from the speed sensors 44 and second speed sensors 70 exceed the threshold 56 or threshold band 58. The processor 48 may be further configured to declare rotor blade damage only if voltage V measurements from at least one of the speed sensors 44 and at least one of the second speed sensors 70 exceed the threshold 56. Thus if none of the voltage V measurements from the second speed sensors 70 exceed the threshold 56 the processor 48 will not declare rotor blade damage even if voltage V measurements from multiple speed sensors 44 do exceed the threshold 56, or vice versa.

The processor 48 may also be configured to increment a counter value in a counter 76. The counter 76 may be a function of the processor 46 or may be separate from it. The processor 48 may increment the counter value when the voltage amplitude V exceeds the threshold 56. The processor 48 may monitor the counter 76 to take account of the counter value. The processor 48 may be configured to output the rotor blade damage signal dependent on the counter value. For example, the processor 48 may output the rotor blade damage signal when the counter value increments to one, which is equivalent to the processor 48 outputting the rotor blade damage signal on the basis of the comparison of the voltage V measurements and the threshold 56. Alternatively the counter value must reach a predetermined number before the rotor blade damage is declared. Thus confirmatory threshold exceedances are required before the damage is declared. For example, the predetermined number may be three so that the counter value must reach three before the rotor blade damage signal is output by the processor 48.

There may be a time constraint on the increment of the counter 76. This means that the counter value is not raised by temporally well-spaced single exceedances of the threshold 56. In order to implement this time constraint the processor 48 may be configured to decrease the counter value if a predetermined length of time has elapsed since the previous increment of the counter value. For example the counter value may be decreased by one after the predetermined length of time. If the voltage amplitude V exceeds the threshold 56 again the processor 48 may send a signal to the counter 76 to increment the counter value upwards again.

Alternatively the processor 48 may be configured to reset the counter value to zero if a predetermined length of time has elapsed since the previous increment of the counter value. This ensures that sufficient threshold exceedances occur within a short period of time to trigger declaration of rotor blade damage and consequent mitigation actions.

The processor 48 may be configured to send a signal to the counter 76 to decrease the counter value if a first predetermined length of time has elapsed since the previous increment of the counter value and to reset the counter value to zero if a second predetermined length of time has elapsed since the previous increment. The first and second predetermined lengths of time may be equal or may differ. Alternatively the processor 48 may be configured to send a signal to the counter 76 to decrease the counter value if a first predetermined length of time has elapsed since the previous increment of the counter value and to reset the counter value to zero if a second predetermined length of time has elapsed since the counter value was decreased. The first and second predetermined lengths of time may be equal or may differ. For example, the first and/or second predetermined lengths of time may be equal to one revolution or two revolutions of the rotor assembly 30.

Figure 7:
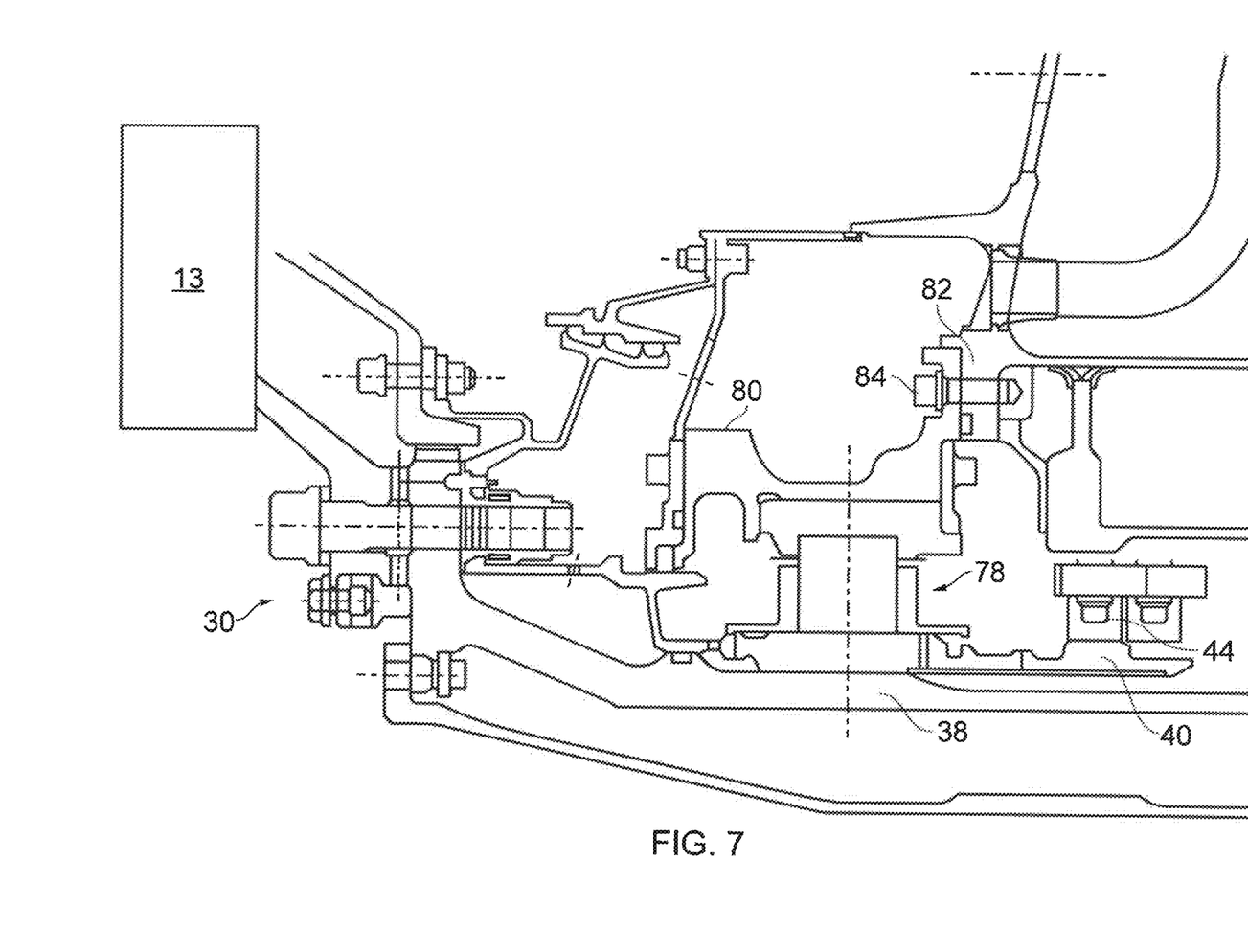
FIG. 7 is a schematic diagram of part of a rotor assembly.

FIG. 7 is a schematic cross-section of part of a rotor assembly 30 in a gas turbine engine 10. The shaft 38 is coupled through bolts to the fan 13. A phonic wheel 40 is mounted to the shaft 38, downstream of the fan 13. A speed sensor 44 is mounted to static structure and positioned in axial alignment with the phonic wheel 40. A bearing 78 radially locates the fan shaft 38. There may be one or more additional bearings 78 axially further from the fan 13. The bearing 78 includes a static bearing housing 80 which is radially outside the shaft 38 and the bearing elements. The bearing housing 80 is mechanically coupled to a series of castellated spigots 82 which extends radially from static structure of the engine 10. The spigots 82 are secured to a flange of the bearing housing 80 by an annular array of bolts 84.

In the event of damage to one or more of the fan rotor blades 34 the rotor assembly 30 centre of balance shifts so that it is no longer concentric with the engine rotational axis 11. Depending on the size of the shift the bolts 84 and spigots 82 may shear or otherwise be severed. Where a complete fan blade 34 is lost the bolts 84 and spigots 82 are severed and then the bearing supporting the intermediate shaft is crushed so that the fan 13 can orbit about its new centre of balance. However, where the damage to the fan blades 34 is less severe the forces on the bolts 84 and spigots 82 may not be sufficient to sever them. Instead the out of balance forces may drive the bolts 84 to unwind so that the bearing housing 80 becomes disengaged from the spigots 82. Consequently the fan assembly 30 orbits somewhat unpredictably and may ultimately damage or even sever the fan case 24 and/or shaft 38.

Advantageously by monitoring the speed sensor 44 for modulation of the voltage amplitude V, particularly modulation at a frequency related to the shaft speed ω, less severe damage to fan blades 34 can be detected and thus mitigated. The modulation of the voltage amplitude V can be detected quickly enough for mitigation actions to be instigated before significant damage has occurred. Advantageously the speed sensor 44 and phonic wheel 40 are not damaged by the orbiting of the fan assembly 30. Thus their overspeed protection function remains intact.

Although rotor blade 34 damage has been described, the method is also effective where other parts of the rotor assembly 30 are damaged resulting in damage and/or displacement of the bearing support. For example loss of annulus fillers, the spinner or rotating seal may also result in relative movement between the shaft 38 and the speed sensor 44.

The rotor assembly 30 may be in a gas turbine engine 10 used to power an aircraft, a marine vessel or a land-based power plant.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A rotor assembly in a gas turbine engine, the rotor assembly comprising:
   a rotor having an annular array of rotor blades, the rotor being mounted to a shaft;
   a phonic wheel coupled to the shaft;
   a first speed sensor axially aligned with the phonic wheel and configured to measure voltage, an amplitude of the measured voltage being proportional to a clearance between the first speed sensor and the phonic wheel; and
   a processor configured to:
      receive the measured voltage from the first speed sensor;
      derive a shaft speed from the measured voltage;
      identify modulation of the amplitude of the measured voltage at a frequency that is an integer multiple of the shaft speed, the modulation of the amplitude of the measured voltage being caused by variations in the clearance resulting from radial movement of the shaft;
      compare the amplitude of the measured voltage to a normal rotor amplitude, the normal rotor amplitude being a constant amplitude level over time;
      determine a difference between the amplitude of the measured voltage and the normal rotor amplitude;
      compare a magnitude of the determined difference to a threshold value; and
      output a rotor damage signal based on a result of the comparison of the magnitude of the determined difference to the threshold value.

2. The rotor assembly as claimed in claim 1, wherein the threshold value includes a ratio of a maximum amplitude to an average voltage amplitude of the measured voltage.

3. The rotor assembly as claimed in claim 1, wherein the threshold value includes a predetermined proportion of a maximum amplitude of the measured voltage.

4. The rotor assembly as claimed in claim 3, wherein the threshold value includes 80% of the maximum amplitude.

5. The rotor assembly as claimed in claim 1, wherein the output of the rotor damage signal is performed when the amplitude exceeds the threshold value.

6. The rotor assembly as claimed in claim 1, wherein the output of the rotor damage signal is performed when the amplitude is lower than the threshold value.

7. The rotor assembly as claimed in claim 1, wherein the rotor is a fan.

8. The rotor assembly as claimed in claim 1, further comprising a second phonic wheel and a second speed sensor axially aligned with the second phonic wheel and configured to measure voltage.

9. The rotor assembly as claimed in claim 8, wherein the processor is configured to output the rotor damage signal based on the comparison of the amplitude of the measured voltage from each of the first speed sensor and the second speed sensor with the threshold value.

10. The rotor assembly as claimed in claim 1, wherein the processor is further configured to increment a counter value when the amplitude is greater than the threshold value.

11. The rotor assembly as claimed in claim 10, wherein the processor is configured to output the rotor damage signal when the counter value is one.

12. The rotor assembly as claimed in claim 10, wherein the processor is configured to output the rotor damage signal when the counter value is three.

13. The rotor assembly as claimed in claim 10, wherein the processor is configured to decrease the counter value when a predetermined length of time has elapsed since a previous increment.

14. The rotor assembly as claimed in claim 10, wherein the processor is configured to reset the counter value to zero when a predetermined length of time has elapsed since a previous increment.

15. A gas turbine engine comprising the rotor assembly as claimed in claim 1.

16. The gas turbine engine as claimed in claim 15, further comprising an engine controller configured to:
   receive the rotor damage signal; and
   generate an engine control signal.

17. The gas turbine engine as claimed in claim 16, wherein the engine control signal includes (i) a command to decelerate the gas turbine engine to idle, or (ii) a command to shut down the gas turbine engine.

18. A method to detect rotor damage in a gas turbine engine, the method comprising:
   monitoring speed of a rotor shaft using a phonic wheel and speed sensor;
   monitoring an amplitude of a voltage from the speed sensor;
   identifying modulation of the monitored amplitude at a frequency that is an integer multiple of the shaft speed, the modulation of the amplitude of the voltage being caused by variation in a clearance resulting from radial movement of the rotor shaft;
   comparing the amplitude of the monitored voltage to a normal rotor amplitude, the normal rotor amplitude being a constant amplitude level over time;
   determining a difference between the amplitude of the monitored voltage and the normal rotor amplitude;
   comparing a magnitude of the determined difference to a threshold value; and declaring rotor damage based on a result of the comparison of the magnitude of the determined difference to the threshold value.

* * * * *